(12) United States Patent
Koren et al.

(10) Patent No.: US 7,830,815 B1
(45) Date of Patent: Nov. 9, 2010

(54) METHOD AND APPARATUS FOR MEASURING AND EXTRACTING PROXIMITY IN NETWORKS

(75) Inventors: Yehuda Koren, Elizabeth, NJ (US);
Stephen North, Lebanon, NJ (US);
Christopher Volinsky, Morristown, NJ (US)

(73) Assignee: AT&T Intellectual Property II, Reno, NV (US)

( * ) Notice: Subject to any disclaimer, the term of this patent is extended or adjusted under 35 U.S.C. 154(b) by 321 days.

(21) Appl. No.: 11/552,854

(22) Filed: Oct. 25, 2006

(51) Int. Cl.
*H04L 12/26* (2006.01)
(52) U.S. Cl. ...................... 370/252; 370/255
(58) Field of Classification Search ........... None
See application file for complete search history.

(56) References Cited

U.S. PATENT DOCUMENTS

2005/0243736 A1* 11/2005 Faloutsos et al. ............ 370/254

OTHER PUBLICATIONS

Liben-Nowell, David; Kleinberg, Jon. The Link Prediction Problem for Social Networks. ACM Conference on Information and Knowledge Management (2003)—ISBN: 1-58113-723-0.*

* cited by examiner

*Primary Examiner*—Jason E Mattis
*Assistant Examiner*—Benjamin Lamont

(57) ABSTRACT

A method and apparatus for measuring and extracting proximity in networks are disclosed. In one embodiment, the present method receives a network from a user for analysis and extraction of a smaller proximity sub-graph. The method computes a candidate sub-graph and determines at least one Cycle Free Escape Conductivity (CFEC) proximity of at least two nodes in accordance with the candidate sub-graph. The method then extracts and presents a proximity sub-graph that best captures the proximity.

20 Claims, 6 Drawing Sheets

METHOD AND APPARATUS FOR MEASURING AND EXTRACTING PROXIMITY IN NETWORKS

The present invention relates generally to data processing and, more particularly, to a method and apparatus for measuring and extracting proximity in networks.

BACKGROUND OF THE INVENTION

Networks convey information about relationships between objects. Consequently, networks are used to model many kinds of information in fields ranging from communications and transportation to organizational and social network domains. Measuring distance or some other form of proximity or "closeness" in networks between two objects can be used as a data-mining tool. It may be applied directly to compare similarities between items, or within a more general scheme such as clustering and ordering. Moreover, measuring proximities may be useful to characterize the global structure of a network by showing the closeness of network components. For example, in a network with missing data, proximities may identify links that have been removed or cannot be observed. Proximities may also be used to find clusters, communities that behave similarly, etc.

In a network where links represent phone or email communications, proximity may measure potential information exchange between two non-linked objects through intermediaries. In a network where edges represent physical connections between machines, proximity may represent latency or speed of information exchange. In today's communication infrastructure, the speed of information exchange may be directly proportional to profits, as for example in the purchase and/or sale or stocks on the stock market.

Therefore, there is a need for a method and apparatus for measuring and extracting proximity in networks.

SUMMARY OF THE INVENTION

In one embodiment, the present invention discloses a method and apparatus for measuring and extracting proximity in networks, e.g., packet networks, social networks and the like. The method receives a network from a user for analysis and extraction of a smaller proximity sub-graph. The method computes a candidate sub-graph and determines at least one Cycle Free Escape Conductivity (CFEC) proximity of at least two nodes in accordance with the candidate sub-graph. The method then extracts and presents a proximity sub-graph that best captures the proximity.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention broadly discloses a method and apparatus for measuring and extracting proximity in networks. Although the present invention is discussed below in the context of an illustrative packet network, the present invention is not so limited. Namely, the present invention can be applied to other types of networks such as the cellular networks, social networks, and the like to predict connections between objects, individuals and the like (broadly defined as nodes of the network).

Figure 1:
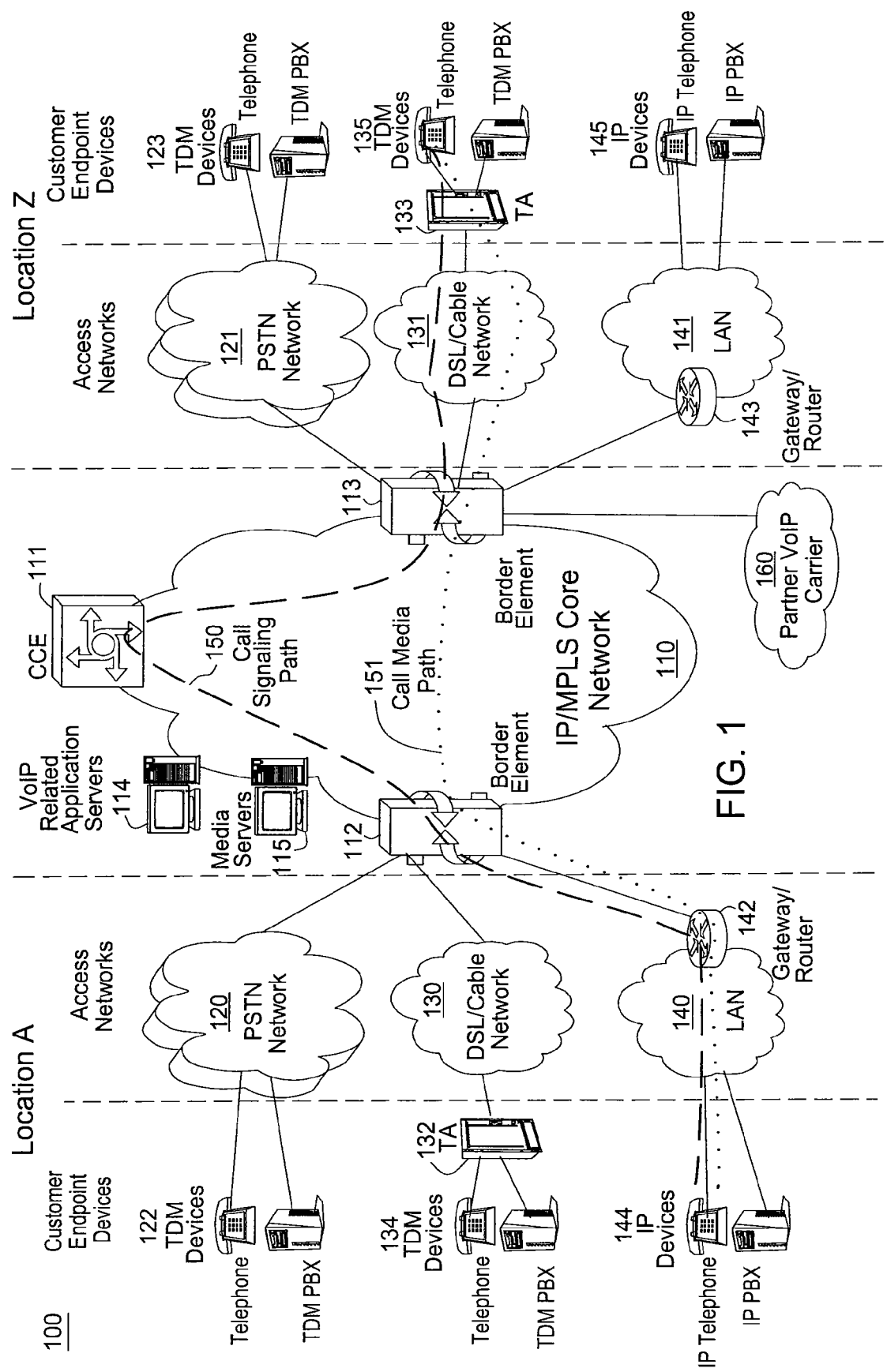
FIG. 1 illustrates an exemplary network related to the present invention.

To better understand the present invention, FIG. 1 illustrates an exemplary network 100, e.g., a packet network such as a VoIP network related to the present invention. Exemplary packet networks include Internet protocol (IP) networks, Asynchronous Transfer Mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted as limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network 130, 131 via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and/or router 142. A packet based access network 130 or 131, such as DSL or Cable, when used together with a TA 132 or 133, is used to support TDM based customer endpoint devices.

The core VoIP infrastructure comprises of several key VoIP components, such as the Border Elements (BEs) 112 and 113, the Call Control Element (CCE) 111, VoIP related Application Servers (AS) 114, and Media Server (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that requires certain service specific features, e.g. translation of an E.164 voice network address into an IP address and so on. For calls that originate or terminate in a different carrier, they can be handled through the PSTN 120 and 121 or the Partner IP Carrier 160 interconnections. A customer in location A using any endpoint device type with its associated access network type can communicate with another customer in location Z using any endpoint device type with its associated network type.

The above packet network is described to provide an illustrative environment in which objects (or broadly nodes) are connected in communication networks. These networks are often complex and large. Measuring proximity in these networks needs to take into account multiple and separate paths between the objects. Calculating network proximity may require displaying the network between the objects and involves significantly more information than a direct comparison of the two relevant objects. In complex networks such as communication networks, this can be an overwhelming and a time consuming task. Therefore, there is a need for a method to measure and to extract proximity information efficiently in a network that captures the relationships between two of more of the network's objects.

The current invention provides a method for measuring proximity in networks and extracting proximity sub-graphs. In one embodiment of the present invention, an analysis on the proximity sub-graph is able to provide the pertinent information for the larger graph being analyzed. To better understand the present invention, the following networking and graph theory terminology will first be provided. These terminologies are that of:

Proximity;
Graph-theoretic distance;
Network flow;
Effective conductance; and
Sink-augmented effective conductance.

Proximity is a measure of closeness between two objects in a network. However, since there are many types of networks, the definition of proximity will depend on a specific application. Generally, the notion of proximity is strongly tied to the definition of an edge in the network. In other cases, proximity estimates the likelihood that a link will exist in the future, or is missing in the data for some reason. For instance, if two people speak on the phone to many common friends, the probability is high that they will talk to each other in the future, or perhaps that they have already communicated through some other medium such as email. There are many uses for good proximity measures. For example, in a social network setting, proximities may be used to track or predict the propagation of a product, an idea, or a disease. Proximities may also help discover unexpected communities in any network. Using proximities, a product-marketing strategist may target individuals who are in close proximity to previous purchasers of the product, or target individuals who may have many people in close proximity for viral marketing and so on.

To illustrate the notion of proximity, one can formalize the definition of proximity in terms of the shortest path between objects. For a graph G(V,E), let V represent nodes in the network as the network objects, E represent edges in the network as links between the network objects. If edge (i, j) is one of the edges in the network, the weight of edge $(i, j) \in E$ is denoted by $w_{ij} > 0$ and reflects the similarity of i and j (higher weights reflect higher similarity). For non-adjacent nodes, $(i, j) \notin E$, and the weights $w_{ij} = 0$. Each node is associated with a degree greater or equal to the sum of the edge weights coming out of that node. Typically, $deg_i = \Sigma_{j:(i,j) \in E} w_{ij}$.

Graph-theoretic distance refers to length of the shortest path connecting two nodes, measured either as the number of hops between the two nodes, or the sum of the edge lengths along the shortest path. Proximity decays as nodes become farther apart. Hence, low distance equates to high proximity. It is noted that information following a path can be lost at any link due to the existence of noise or friction. Therefore two nodes that are not connected by a short path are unlikely to be related. Distance in graphs may be computed very efficiently. However, this measure does not account for the fact that the relationships between network entities might be realized along many different paths. In some instances, such as managed networks, it may be reasonable to assume that information between nodes is propagated only along the most "efficient" routes. However, this assumption is dubious in real world social networks, where information can be propagated randomly through all possible paths.

Figure 2:
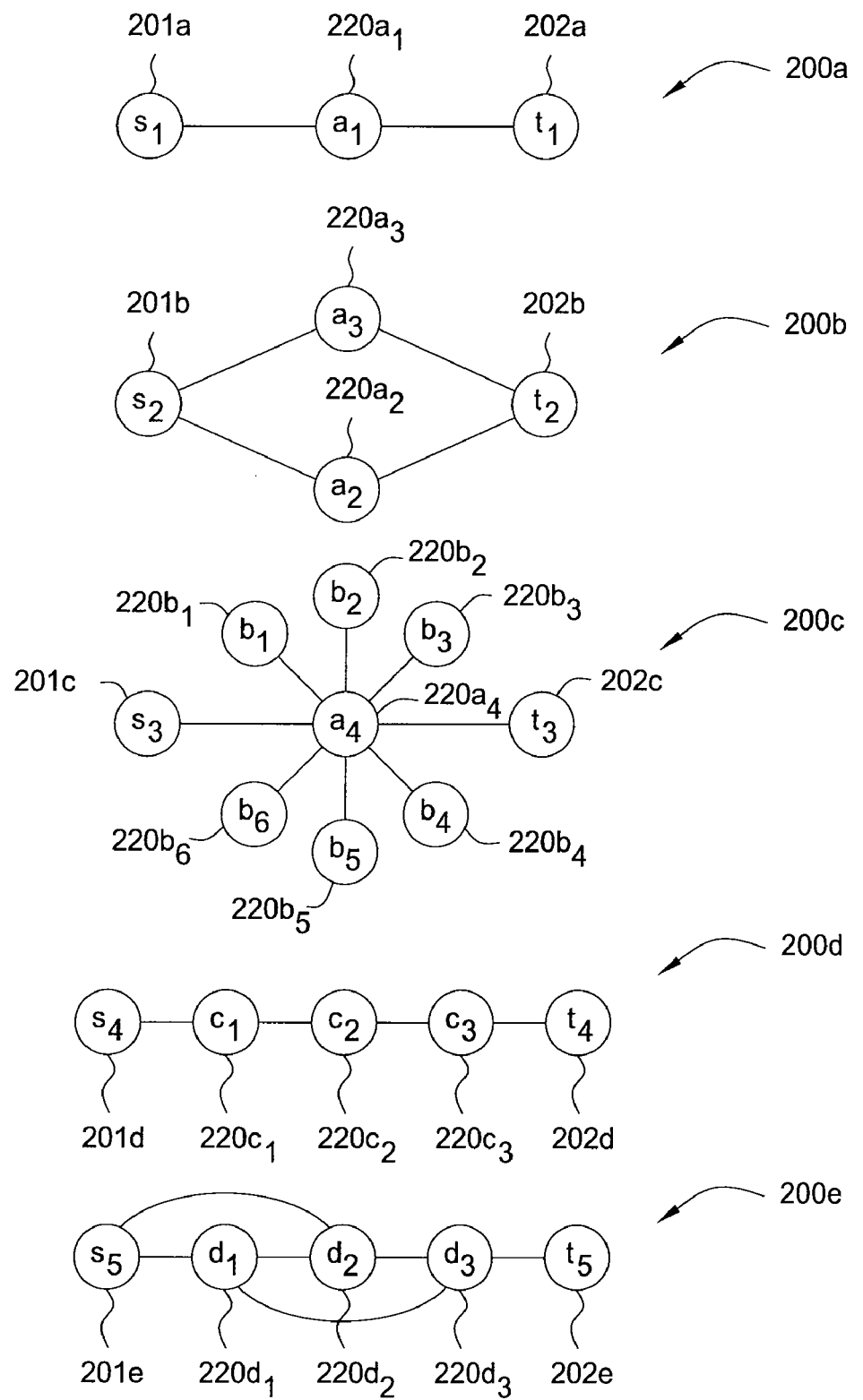
FIG. 2 illustrates an exemplary collection of graphs in which all edge weights equal 1.

FIG. 2 illustrates an exemplary collection of graphs 200a-200e. The graphs contain source nodes 201a-201e, terminal nodes 202a-202e, and intermediate nodes $220a_1$-$220a_3$, $220b_1$-$220b_6$, $220c_1$-$220c_3$, and $220d_1$-$220d_3$. For clarity, the source nodes are collectively referred to as node s and the terminal nodes are collectively referred to as node t. If the subscript "i" represents a particular source node for i=1, 2, 3, the graph-theoretic distance between nodes $s_i$ and $t_i$ is 2, yet different conclusions about their proximity may be made. For example, $s_2$ may be closer to $t_2$ (e.g., see graph 200b) than $s_i$ is to $t_1$ (e.g., see graph 200a), because they have more "friends" in common (or having multiple paths). Given that $s_3$ and $t_3$ (e.g., see graph 200c) are only connected through a node with high degree, the proximity might indicate that they are not close at all (as in two people who both call a common toll free telephone number). Ideally, proximity is more sensitive to edges between low-degree nodes that show meaningful relationships and also takes into account multiple paths between the nodes.

Network Flow refers to a measure of proximity between nodes (e.g., s and t) calculated by assigning a limited capacity to each edge in the network (e.g., one proportional to its weight) and then determining the maximal number of units that may be delivered from node s to node t simultaneously. This maximal flow may then be taken as a measure of s-t proximity. Network flow favors high weight (thus, high capacity) edges, and captures the premise that increasing the number of alternative paths between nodes s and t increases their proximity. For the example network in FIG. 2, twice as many units may be delivered between $s_2$ and $t_2$ (e.g., see graph 200b) than may be delivered between $S_1$ and $t_1$ (e.g., see graph 200a), thereby gaining from the alternative paths. However, maximal flow disregards path lengths, so that the same maximal flow is obtained between $s_4$ and $t_4$ (e.g., see graph 200d) as between $s_i$ and $t_1$ (e.g., see graph 200a). Also problematic with this definition is that the maximal s-t flow in a graph equals the minimal edge capacity that has to be removed to disconnect s from t. This minimal edge capacity is referred to as s-t cut. The maximal flow then equals the capacity of the bottleneck, making such a measure less robust. For the example in FIG. 2, the maximal flow between $s_5$ and $t_5$ (e.g., see graph 200e) is 1, which is equal to the maximal flow between $s_4$ and $t_4$ (e.g., see graph 200d), despite the added pathways in $s_5$-$t_5$. From the information flow viewpoint, this measure is dependent on the bottleneck, and does not account for multiple paths or node degrees. Thus, network flow may be beneficial in some scenarios, but may be less robust in other scenarios.

Effective conductance is a proximity measurement approach in which a network is modeled as an electric circuit by treating the edges as resistors whose conductance values represent the given edge weights. This way, higher weight edges will conduct more electricity. When dealing with electric networks, a natural s-t proximity measure is found by setting the voltage of s to 1, while grounding t (so its voltage is 0) and solving a system of linear equations to estimate voltages and currents of the network. The computed delivered current from s to t, is called the effective conductance (EC).

Figure 3:
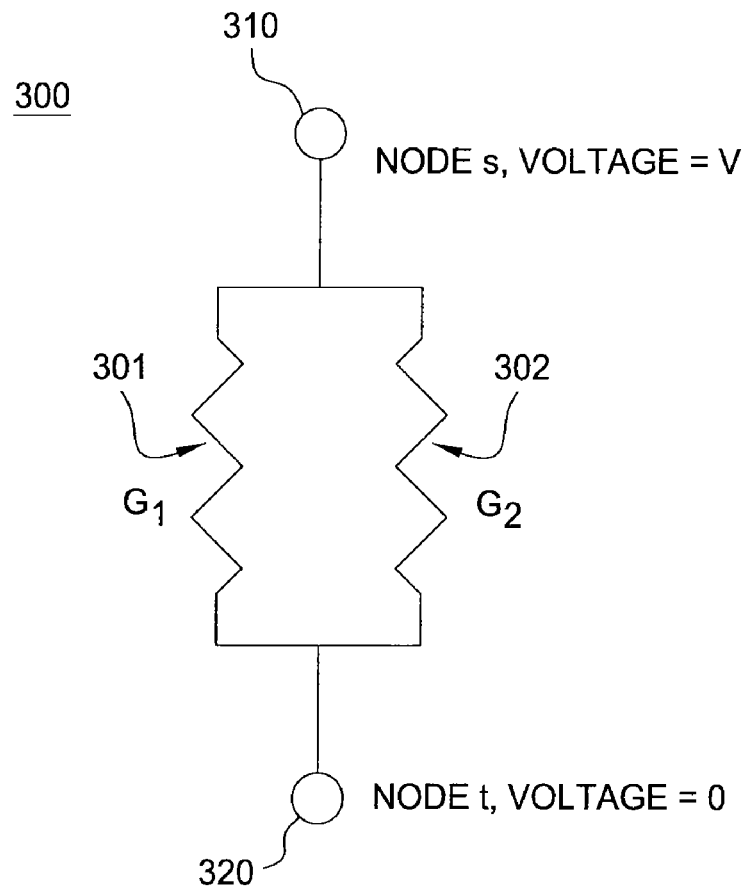
FIG. 3 illustrates an example of a small network modeled by resistors with conductances $G_1$ and $G_2$.

FIG. 3 illustrates an illustrative network 300 modeled by resistors with conductances $G_1$ and $G_2$. The source node 310 (s) is defined with voltage V=1 and the terminal node 320 (t) has 0 voltage. In this configuration, the current in the branch containing resistor 301 may be derived from the conductance $G_1$. For example, the current in resistor 301 is then $i_1 = V*G_1 = G_1$. The current in the branch containing resistor 302 may be derived from the conductance $G_2$. For example, the current in resistor 302 is then $i_2 = V*G_2 = G_2$. If $G_2 > G_1$, then $i_2 > i_1$. The effective conductance $G_{EF}$ of this network is then $G_{EF} = G_1 + G_2$. An important advantage of the effective conductance approach is that it accounts for both path length and the number of alternative paths (favoring short paths like graph-theoretic distance and favoring more paths like maximal flow) while avoiding dependence on a single shortest path or a single bottleneck. Another appealing property of EC is that it has an equivalent intuitive definition using random walks as described below.

First, represent the effective conductance between s and t by EC(s, t). Also, let $P_{esc}(S \rightarrow t)$ P be the escape probability, the probability that a walk starting at s reaches t before returning to s. EC(s, t) may be expressed as:

$$EC(s,t) = \deg_s \cdot P_{esc}(s \rightarrow t) = \deg_t \cdot P_{esc}(t \rightarrow s)$$

The effective s-t conductance is the expected number of "successful escapes" from s to t, where the number of attempts equals the degree of s. From an information-sharing viewpoint, this interpretation captures the essence of unmanaged, self-organizing networks when information, or general interactions, may pursue random routes rather than following well planned routes. Consequently, the escape probability decreases if long paths must be followed, because when tracking a long path from s to t there is a good chance of returning to s before reaching t.

The Effective Conductance (EC) is monotonic with respect to the underlying network. This means, in an electrical resistor network, increasing the conductance of any resistor or adding a new resistor can only increase the conductance between any two nodes in the network. This means that each additional s-t path contributes to an escape from s to t, increasing the EC. For example, in FIG. 2, this implies that $EC(s_5, t_5) > EC(s_4, t_4)$, and $EC(s_2, t_2) > EC(s_1, t_1)$. While being monotonic is desirable in some cases, in other cases it may contradict the desired notion of proximity. As an example, again in FIG. 2, $EC(s_1, t_1) = EC(s_3, t_3)$. In terms of random walks, the nodes of degree 1 emanating from node $a_4$ to $b_1$ through $b_6$ have no effect on escape probability, and therefore on EC, because any walk following these edges is going nowhere and will eventually backtrack to $a_4$. Such backtracking means the random walk can make an unlimited number of attempts to reach s or t through these high-degree nodes without affecting the EC. Real-world datasets typically follow power laws in their degree distribution and have many nodes of degree 1, so this shortcoming may be quite significant. Links into degree-1 nodes indicate real relationships, and should not be neglected when measuring proximity.

Sink-augmented effective conductance refers to a modified version of the effective conductance model. In this modified version, each node is connected to a universal sink carrying 0 voltage. Thus, the universal sink competes with t in attracting the current delivered from s. It has the effect of a "tax" on every node that absorbs a portion of the outgoing current. Consequently, this forces all nodes to have a degree greater than 1, so the issue mentioned with degree-1 nodes can no longer exist. Considering the universal sink from the random-walk perspective, it gradually overwhelms the walk, as after each step there is a certain probability that the walk will terminate in the universal sink.

The universal sink model requires a parameterization of the sink edges, to determine how much of the flow through each node is taxed. Understanding how such a parameter influences the computed proximities is necessary. However, the universal sink has shortcoming as it destroys the monotonic behavior. As the network becomes larger, more paths are added between s and t. As the number of paths increases, the proximity between s and t usually decreases and approaches zero for large networks. The reason is that every new node provides a direct link to the sink, while usually not providing a direct link to the destination t. Therefore, increasing the number of nodes strengthens the sink to the point that t is not able to compete for delivered current. This introduces a counterintuitive size bias: the proximity between s and t calculated from a graph is typically significantly increased when looking at a small sub-graph of that graph. One immediate implication of this size bias artifact is that it thwarts the goal of proving (or explaining) proximity using a small representative sub-graph; since the proximity value strongly depends on the graph size, each selected sub-graph conveys a different proximity value, which may be much larger for smaller sub-graphs. There is no known method to compute optimal sub-graph size or to understand how to normalize for graph size. Moreover, this dependency on size makes proximity comparison across different pairs difficult if not impossible. Therefore, while sink-augmented current delivery solves many of the problems previously mentioned, its non-monotonic nature makes it unsuitable for measuring proximity.

In contrast, the current invention provides a method for measuring proximity is based on improved effective conductance measure. The random walk interpretation is therefore utilized. To better understand the present invention, the following definitions are introduced for directed and undirected graphs:

In the random walk, the probability of transitioning from node i to node j is $$p_{ij} = \frac{w_{ij}}{deg_i},$$

where represents the weight between nodes i and j, and $deg_i$ represents the degree of node I;

Given a path $P=v_1$-$v_2$-...$v_r$, the probability that a random walk starting at $v_1$ will follow this path is given by:

$$\text{Prob}(P) = \prod_{i=1}^{r-1} \frac{w_{v_i v_{i+1}}}{deg_{v_i}};$$

and
The weight of path P, $W_{gt}(P)$ is:

$$W_{gt}(P) = deg_{v_1} \text{Prob}(P).$$

Recall that effective conductance is related to the escape probability. Escape probabilities are characterized by a random walk that makes an unlimited number of trials to reach an endpoint s or t; meanwhile, it might backtrack and visit the same nodes many times. This is problematic when measuring proximity because the measure does not consider any such paths to be distracting paths that lower s-t proximity. This problem is circumvented by considering cycle-free escape probabilities that disallows backtracking and revisiting nodes. Formally defined, cycle-free escape probability $P_{cf,esc}$ (s→t) from s to t is the probability that a random walk originating at s reaches t without visiting any node more than once. The Cycle Free Effective Conductance (CFEC) is then:

$$EC_{cf}(s,t) = CFEC(s,t) = deg_s P_{cf,esc}(s \to t)$$

where, $EC_{cf}(s,t)$ or CFEC(s, t) is the expected number of walks completing a cycle free escape from s to t, given $deg_s$ such walks are initiated.

Let R be the set of simple paths from s to t, where simple paths are paths that never visit the same node twice. Then, $$P_{cf,esc}(s \to t) = \sum_{i \in R} \text{Prob}(i)$$

Similarly, by multiplying by the degree:

$$CFEC(s \to t) = \sum_{i \in R} W_{gt}(i)$$

Figure 4:
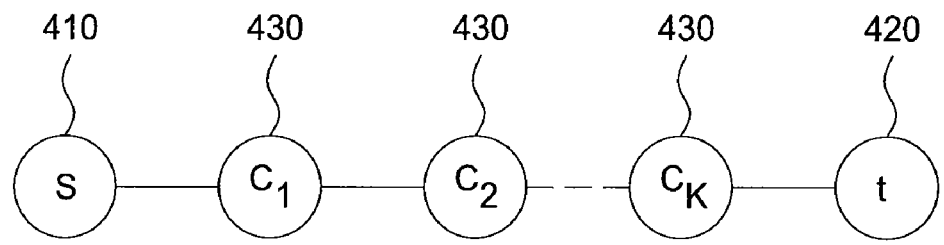
FIG. 4 illustrates a family of s-t paths.

A cycle-free escape proceeds along a simple path from s to t, so the above equation merely sums the probabilities of all possible disjoint events. FIG. 4 illustrates a family of graphs 400 with $deg_s=1$. If a data is located at an intermediate node 430 ($c_i$) between source node 410 and terminal node 420, the probability of not returning to a node already visited such as $c_{i+1}$ is ½.

Therefore, $$CFEC(s, t) = \left(\frac{1}{2}\right)^k = 2^{-k}$$

and the s-t proximity decays exponentially with distance.

Figure 5:
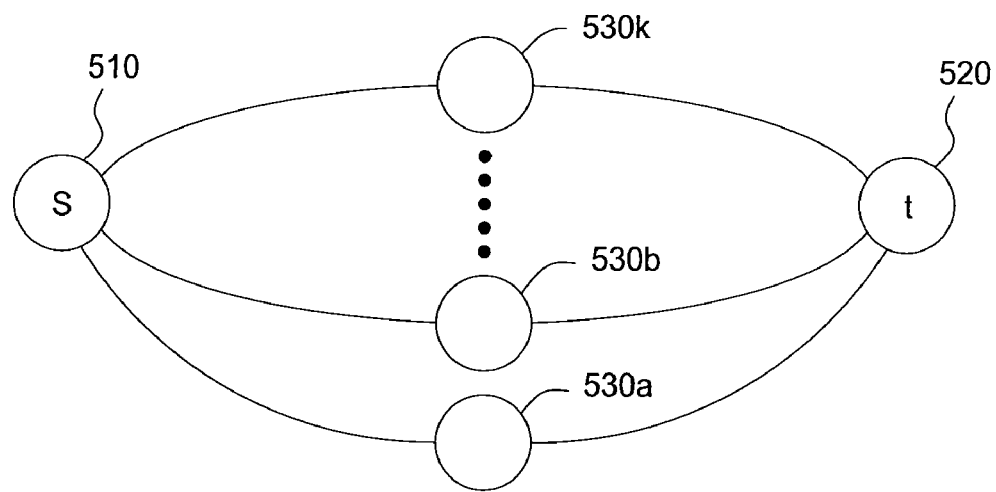
FIG. 5 illustrates a family of graphs characterized by the number of s-t paths.

Another desirable property of a proximity measure is that it favors pairs that are connected by multiple paths. This property, too, is inherent to CFEC, being a sum of (positive) weights of all alternative paths. FIG. 5 illustrates a graph family 500 with $deg_s=k$. The graph contains a source node 510, terminal node 520 and intermediate nodes 530a-530k. For each intermediate node $a_i$ in FIG. 5, the probability of not returning to a node already visited equal to half (½). Therefore, the CFEC(s, t) proximity is k/2 which grows with the number of alternative paths.

Figure 6:
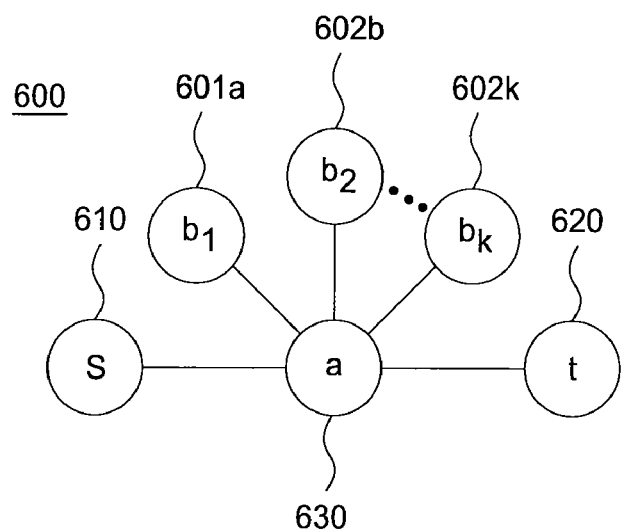
FIG. 6 illustrates a family of graphs with an intermediate node of varying degree.

Now consider the issue of degree-1 nodes and, in general, dead end paths. Recall that such paths were neglected by the other proximity measures, because of their monotonicity property. However, with CFEC any simple path leading from s to a node other than t needs to reduce the probability of escaping to t. FIG. 6 illustrates a family of graphs 600 with varying degrees for intermediate node 630 disposed between source node 610 and destination node 620. The degree-1 nodes 601a-601k dilute the significance of the s→a, a-t links, yielding 1/(k+2) CFEC proximity for this family of graphs. This is also tightly related to discounting the effect of high-degree nodes, as any single path passing through a node has a probability that is inversely proportional to the degree of that node.

It is reasonable to expect that the most accurate proximity value to be the one that is measured on a full network. However, performing proximity measurements on the full network is computationally expensive and impractical. Consequently, it is very useful to obtain a smaller sub-graph that is a good representation of the larger graph. When proximity is measured on increasingly larger sub-graphs, it is expected that the results steadily converge towards the more accurate value. To this end, the operation we use for cutting a subgraph from the full graph preserves node degrees. Formally, given a graph G(V,E) and a subset V' ⊂ V, then the subgraph induced by V' is: G'(V',E') where E'={(i,j)∈E|i,j∈V'} and degrees are unchanged. That is, for each i∈V': the degree of i in G' is equal (by definition) to the degree of i in G. Here, we took the liberty to use node degrees that are greater than the sum of respective adjacent edge weights (consistent with our definition of degree). In essence, each node has a self loop whose weight ensures that each degree equals the sum of adjacent edge weights.

Preservation of original degrees ensures that CFEC proximity measured on a graph cannot be smaller than the CFEC proximity measured on a sub-graph since in the definition of CFEC, any simple s-t path that exists in the sub-graph $G_{sub}$ must have the same weight (or probability) as in the full graph G. However, there might be additional s-t paths that exist only in G which may lower CFEC proximity when measured on the $G_{sub}$. Therefore CFEC proximity is a monotonic series under this sub-graph operation. The series is tightly bounded from above by the proximity measured on the full graph. In other words, when measuring proximity on a sub-graph of the full network, the larger the sub-graph becomes the more accurate the measure becomes, which is again a desirable property.

Measuring proximity on an s-t neighborhood requires only a small fraction of the full graph. Further increasing the neighborhood size yields diminishing improvements. Hence, when an accurate proximity measure is needed, one cannot lose accuracy by working with the largest possible network. Also, CFEC proximity may often be explained by small sub-graphs, in the sense that if a certain proximity value is measured on a very small sub-graph, then this value is a provable lower bound of the accurate proximity value. For example, a significant portion of the proximity for a large network may be explained by a sub-graph with fewer than 30 nodes. This characteristic indicates that the small sub-graphs that may be easily visualized (also called proximity graphs or readable sub-graphs) are effective in capturing the relationships that determine CFEC proximity. The present method allows assignment of confidence scores on proximity of sub-graphs that reflect how well they describe full proximity. The confidence scores are higher when the proximity measured on the sub-graph is close to the proximity measured on the full network.

Directed graphs differ from undirected graphs in having asymmetric connections, so an edge i→j can be used only for moving from i to j, but not vice versa. In contrast to electrical resistor network models, cycle-free effective conductance models accommodate directed edges, as the underlying notions remain well defined for directed graphs. One issue is the emerging asymmetry CFEC(s, t)≠CFEC(t, s). In fact, the asymmetry may be viewed as a reflection of the inherent asymmetry of directed edges, which, also exist in the graph-theoretic distance—the other proximity measure that deals with edge directions. If needed, this asymmetry may be removed by taking the sum CFEC(s, t)+CFEC(t, s) or the product CFEC(s, t)·CFEC(t, s) as the s-t proximity.

Accurate approximations of the CFEC proximity may be found although not much accuracy is needed. For example, estimating the order of magnitude of proximity may suffice. In one implementation, proximity values are lognormal distributed as defined below.

A random variable X has a lognormal distribution if:
expected value of the log(X)=μ;
variance of log(X)=σ; and
probability density of X is $$\phi(x) = \begin{cases} \frac{1}{x\sigma\sqrt{2\pi}} e^{-\frac{(\log(X)-\mu)^2}{2\sigma}} & x > 0 \\ 0 & x \leq 0 \end{cases}.$$

Recalling the equation for cycle free escape probability, $$P_{cf,\,esc}(s \rightarrow t) = \sum_{i \in R} \text{Prob}(I),$$

this probability may be estimated using only the most probable s-t paths. For example, if the simple s-t paths are ordered by probability then the 100th path is typically a million times less probable than the first, the CFEC(s, t) is estimated by restricting the summation in the above equation to the k most probable simple paths $i_k$, where the k most probable paths are determined by a threshold. For example, a good threshold is $10^{-6}$. A threshold of $10^{-6}$ means the probability of the unused paths drops by a factor of $10^{-6}$ below that of the most probable path. An algorithm may be used to find simple s-t paths in order of decreasing probability. In order to use an algorithm, the edge weights are first transformed into edge lengths, establishing a 1-1 correspondence between path probability and path length. For each edge (i, j), its edge length $l_{ij}$ is defined as:

$$l_{ij} = -\log\left(\frac{w_{ij}}{\sqrt{deg_i deg_j}}\right).$$

Using these edge lengths, path lengths correspond to path probabilities via the equation:

$$\text{Prob}(R) = \sqrt{\frac{deg_t}{deg_s}} \cdot e^{-Length(R)}$$

where, R represents some s-t path. In the above equation, the shortest path is the most probable path, the second shortest path is the second most probable path, and so on.

Determining the k shortest simple paths involves finding several paths in order of increasing length. The algorithm successively generates paths of monotonically increasing length. In one embodiment, the program execution is stopped when the path probability drops below a certain threshold. For a typical network, the number of such computed paths k is on the order of a few hundred. The estimated CFEC proximity is then:

$$CFEC(s, t) = \sum_{i \in R} W_{gt}(i).$$

As discussed above, computing a proximity value for large networks takes a long time for the software algorithm to converge to a solution. Therefore, one aspect is to find a method for extracting and explaining the proximity using a small sub-graph that may be easily visualized. These graphs are proximity graphs as defined above. This means that a small readable sub-graph of the original network is needed and the s-t CFEC proximity measured on the small sub-graph is close to the proximity measured on the full network.

The cumulative nature of CFEC proximity, as expressed in the equation $$CFEC(s, t) = \sum_{i \in R} W_{gt}(i)$$

is used. The k paths used for computing the proximity value are stored to serve as the building blocks of the proximity sub-graph as defined below. First, a sorted series of paths $R_k = P_1, P_2, \ldots, P_k$ is stored such that $W_{gt}(P_i) \geq W_{gt}(P_{i+1})$. The proximity sub-graph is found by merging a subset of $R_k$. In one embodiment, the most probable paths are merged without exceeding some fixed bound on the number of nodes B>0. That is, the maximal r for which the union of the paths≦B is computed. The proximity sub-graph is then defined as the sub-graph induced by the union of the first r paths. However, this approach for finding the proximity sub-graph may fail to account for overlaps between paths. Overlapping paths, which share common nodes, have the advantage of increasing the captured proximity while using fewer nodes. Therefore, in another embodiment, better performance may be obtained by looking at general subsets of $R_k$ rather than considering only prefixes $R_k$.

In one embodiment, the method searches for the subset of $R_k$ by finding a subset that captures the maximal s-t proximity when a sub-graph with at most B nodes is extracted. In another embodiment, instead of fixing the number of nodes B, the desired amount of proximity may be fixed to be at least C and the minimal-size sub-graph is extracted and identified as the proximity sub-graph that captures an s-t proximity value of at least C. However, optimizing either B or C may yield inefficient solutions due to the arbitrariness of the choice for B or C. In one embodiment, a sub-graph that maximizes ratio Z that incorporates a size versus proximity tradeoff is used. For example, Z is defined as:

$$Z = \frac{(CFEC^{G_{sub}}(s, t))^\alpha}{\|V_{sub}\|}$$

where, the superscript Gsub indicates measuring CFEC on sub-graph $G_{sub}$, and nodes in the chosen sub-graph are represented by $V_{sub}$. The constant $\alpha \geq 0$ determines the preference in the size versus proximity tradeoff. For large $\alpha$, more attention is given to the numerator to maximize the captured proximity. When $\alpha=0$, only the sub-graph size matters and the optimal solution is the shortest path measured by number of nodes. Similarly, in the other extreme case when $\alpha=\infty$, size becomes irrelevant and an optimal solution is found be merging all k available paths. For typical large networks, choosing $5 \leq \alpha \leq 10$ is effective. Note that by using a ratio Z, the inefficiencies (due to the arbitrariness of a chosen value for B or C) cannot exist. An optimal ratio does not allow a small increase in the denominator (size) to significantly increase the numerator (captured proximity), or vice versa. In a preferred embodiment, the logarithm of the ratio in the above equation for Z is used for the purpose of numerical reduction. The logarithm scale is useful when $\alpha$ is large. Also, in the denominator, it may be useful to replace $\|V_{sub}\|$ with $\|E_{sub}\|$ (or $\|V_{sub}\|+\|E_{sub}\|$) since high edge density interferes with the readability of the graph layout.

The subset of $R_k$ that solves the above problem may be determined heuristically. In one embodiment, the heuristic used is an exact branch-and-bound (B&B) algorithm. B&B may take exponential time and the search may have to be prematurely terminated. If the search is terminated prematurely, the best intermediate solution discovered by B&B is taken. This intermediate solution may be improved upon by a polynomial-time algorithm.

Description of the B&B algorithm: Recalling that paths were ordered by their weights, all subsets of $R_k$ are scanned in order. All subsets containing $P_i$ are then scanned before completing the scan of subsets containing $P_i+1$. This way more promising subsets are targeted first (based on total weight). A full scan would loop through all $2^k$ possible subsets and find an optimal one. For large values of k this may be very time consuming. The running time may be significantly reduced by pruning subsets that are provably sub-optimal. This is accomplished during the scan by recording the best subset found so far. Then, for every new subset, a check is made to determine whether under the most optimistic scenario the new subset may be a part of an optimal solution. The check is done by adding the weights of all subsequent paths to the weight of the current subset, while assuming that the size of the current subset would not be increased at all. If even after this operation the subset's score (according to the equation for Z) is lower than the current best one, the search is pruned skipping this subset and all subsequent subsets containing it.

When the B&B algorithm terminates early the algorithm switches to the "greedy agglomerative" optimizer. This optimizer algorithm starts with the k sets $\{P_1\}, \{P_2\}, \ldots, \{P_k\}$. To take best advantage of the result of the B&B algorithm, all sets whose union is the result returned by the B&B algorithm are merged into a single subset. Then, the algorithm iteratively merges the two sets (replacing the two sets by their union) maximizing the ratio Z until a single set remains. During the process the best set found is recorded and returned as the final result. In one embodiment, the current invention enables setting an upper bound (maxsize) and a lower bound (minsize) to limit the proximity graph's size.

In one embodiment, the present invention provides a method for assessing proximity graphs. Proximity graphs created by the current invention are aimed at capturing maximal proximity with few nodes. By definition, the CFEC-proximity captured in these sub-graphs must be lower than the full CFEC-proximity measured on the whole network. In fact, the captured CFEC may be easily computed by taking the sum of weights of those paths whose merge created the proximity sub-graph. Hence the CFEC-proximity may be used to assess the quality of the sub-graphs by reporting the percentage of captured proximity. For example, a proximity sub-graph with a 10% score is not very informative as it captures only a small fraction of the existing relationships. On the other hand, a sub-graph with a 90% or higher score shows most of the available proximity. Moreover, proximity values between different pairs of objects within the same graph are directly comparable. The current invention provides the ability to compute, optimize, and analyze the proximity scores of proximity sub-graphs.

In one embodiment, the present invention is extended to show relationships among more than two endpoints. The relationship among more than two endpoints is shown by changing the way the set of paths $R_k$ is constructed in the algorithm. If there are multiple endpoints, the algorithm searches for the broader set of shortest paths connecting any two of the given endpoints. This is achieved by a generalization of the algorithm that finds the k simple shortest paths connecting any two members of a given set of nodes.

In one embodiment, the CFEC-proximity and the proximity sub-graph construction algorithm are used to also handle directed edges. The proximity sub-graph deals with entire paths regardless of the direction of their edges. If edges are directed, the algorithm that produces the k shortest paths is modified to account for edge directions. This may increase the running time of the algorithm that normally works on undirected graphs.

Computation on large networks may exceed normal time and space limitations. For example, a database such as the Yahoo Instant Messenger database may have 200 million nodes and 800 million edges. Computation on such large networks is very difficult. However, only a tiny fraction of the network makes a significant contribution to any computed proximity value. Therefore, only a portion of the full network that includes the relevant information has to be analyzed. In one embodiment, the current invention provides a "candidate" sub-graph with the relevant portion of the full network for use when analyzing large networks. For the example above, a "candidate" sub-graph containing a few thousand nodes is sufficient. Then, the proximity value is computed on this "candidate" sub-graph, and the much smaller proximity sub-graph is extracted from the "candidate" sub-graph. Note that the "candidate" sub-graph is a coarse (fast) approximation of the relevant portion of the full network, unlike the more precise computation that extracts the proximity sub-graph.

To illustrate a method for determining a candidate sub-graph, consider the computation of the proximity between two nodes s and t. The first stage in producing the candidate graph is finding a sub-graph containing the highest weight paths originating at either s or t. Recall that the weight of a path starting at node $v_1$ is defined by:

$$W_{gt}(P) = \deg_{v_1} \cdot \text{Prob}(P).$$

By transforming edge weights into edge lengths $l_{ij}$ as described earlier, the problem is reduced to finding a sub-graph containing shortest paths originating at either s or t. Equivalently, the object is to find a series of nodes with increasing distance from $\{s, t\}$. Note that to make the algorithm efficient on a large graph, an indexing mechanism that allows efficient access to the neighborhood of a given node may be used. The algorithm also needs to determine when to stop growing the $\{s, t\}$ neighborhoods.

Let the highest weight (shortest length) s-t path be path P with length L. The path P is discovered by the algorithm when the $\{s, t\}$ neighborhoods grow enough to overlap. Since such an overlap occurs, the path P passes within the neighborhood that was created. Recalling that the CFEC proximity is computed using the k shortest paths, the $(k+1)^{th}$ path is the first path whose weight drops below $\in$ times the weight of the first path. This implies, after transforming weights into lengths, paths longer than $L - \log(\in)$ are not useful. Therefore, the neighborhood is expanded until it covers all s-t paths shorter than $L - \log(\in)$. Consequently, in one embodiment, the most interesting nodes are nodes whose distance from either s or t is at most $(L - \log(\in))/2$. In a large network, the $(L - \log(\in))/2$ neighborhoods might be too large. In these cases, the algorithm may have a size limit that requires the user to stop extending the neighborhood when the neighborhood's size reaches the limit.

Regardless of whether the full $(L - \log(\in))/2$-neighborhoods are generated or the algorithm stopped earlier, the created neighborhood may be pruned to a smaller size. Let dist(i, j) represent the length of the shortest path (graph-theoretic distance) between i and j. Then, if dist(s, i)+dist(t, i)>β, any s-t path going through i must be longer than 6. Therefore, the algorithm computes dist(s, i) and dist(t, i) for each i in the neighborhood. Then, any j for which dist(s, j)+dist(t, j)>L-log(∈), is excluded by the algorithm because no s-t path of appropriate length can pass through such i. Finally, the graph induced by the pruned neighborhood is taken as the candidate sub-graph. The CFEC proximity is calculated between the objects of interest (s and t) with respect to this candidate graph, and the candidate graph that best captures the proximity is extracted as the proximity sub-graph.

Figure 7:
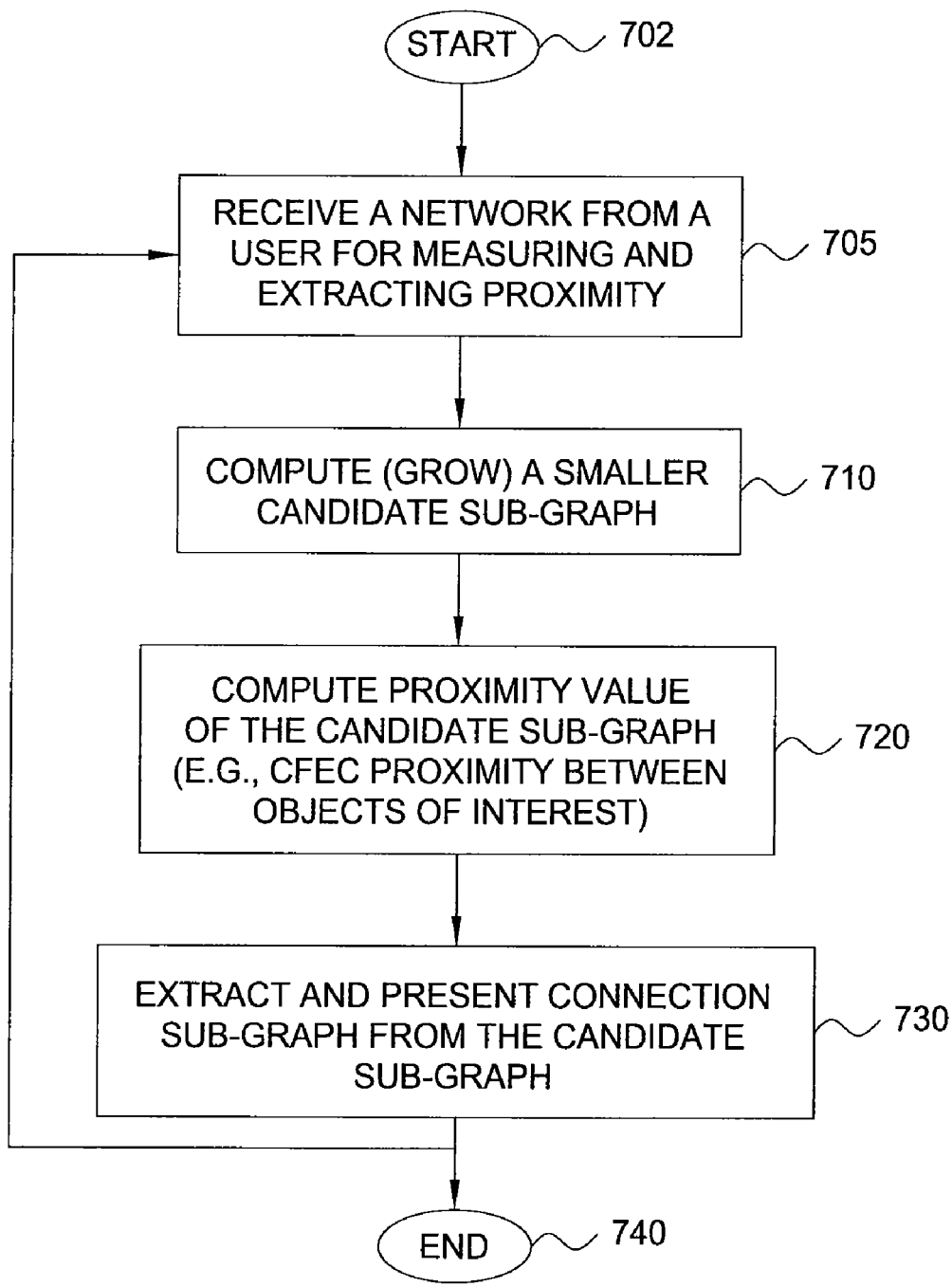
FIG. 7 illustrates a flowchart of a method for measuring and extracting proximity in networks.

FIG. 7 illustrates a flowchart of a method 700 for measuring and extracting proximity in networks. Method 700 starts in step 702 and proceeds to step 705.

In step 705, method 700 receives a network for measuring and extracting proximity. For example, the user identifies a large graph to be analyzed and requests for a smaller proximity sub-graph.

In step 710, method 700 computes (grows) a candidate sub-graph. For example, the candidate sub-graph may be an order of magnitude smaller than the original large graph and is a coarse approximation of the relevant portion of the original network.

In one embodiment, the nodes considered of interest (e.g., s and t) are first identified. To obtain the candidate sub-graph, the method searches for the highest weight paths originating at either nodes s or t by using an algorithm that identifies a series of nodes that have increasing distance from s and t. The algorithm then discovers the shortest path between s and t when the neighborhoods of s and t grow large enough that they overlap each other, or an upper limit imposed on neighborhood size is reached.

In another embodiment, the results of the algorithm on growing neighborhood are pruned to achieve a smaller candidate sub-graph.

In step 720, method 700 computes the proximity value of the candidate sub-graph. For example, it calculates cycle-free escape conductivity (CFEC) proximity between the objects or nodes of interest with respect to this graph. For example, this is accomplished by computing the cycle-free probability for the k most likely paths connecting nodes s and t, and computing the weight of all paths emanating from the starting node s.

In step 730, method 700 extracts and presents (e.g., as visual output) a smaller proximity sub-graph or proximity graph from the candidate sub-graph. For the example above, the proximity sub-graph may be at least an order of magnitude smaller than the candidate sub-graph. This enables the user to visualize the proximity sub-graph much more easily than would be possible with the larger candidate sub-graph. In one embodiment, the proximity sub-graph is chosen using branch and bound (B&B) and agglomerative optimization algorithms. The method then proceeds to step 740.

Method 700 ends in step 740.

In one embodiment, the current invention is used to show relationships between more than two endpoints. It should be noted that when multiple endpoints exist, the search is not for the shortest path between two endpoints but between any two endpoints.

In one embodiment, the current method is used to analyze directed edges. In this case the algorithm produces the k shortest paths that account for edge directions.

Figure 8:
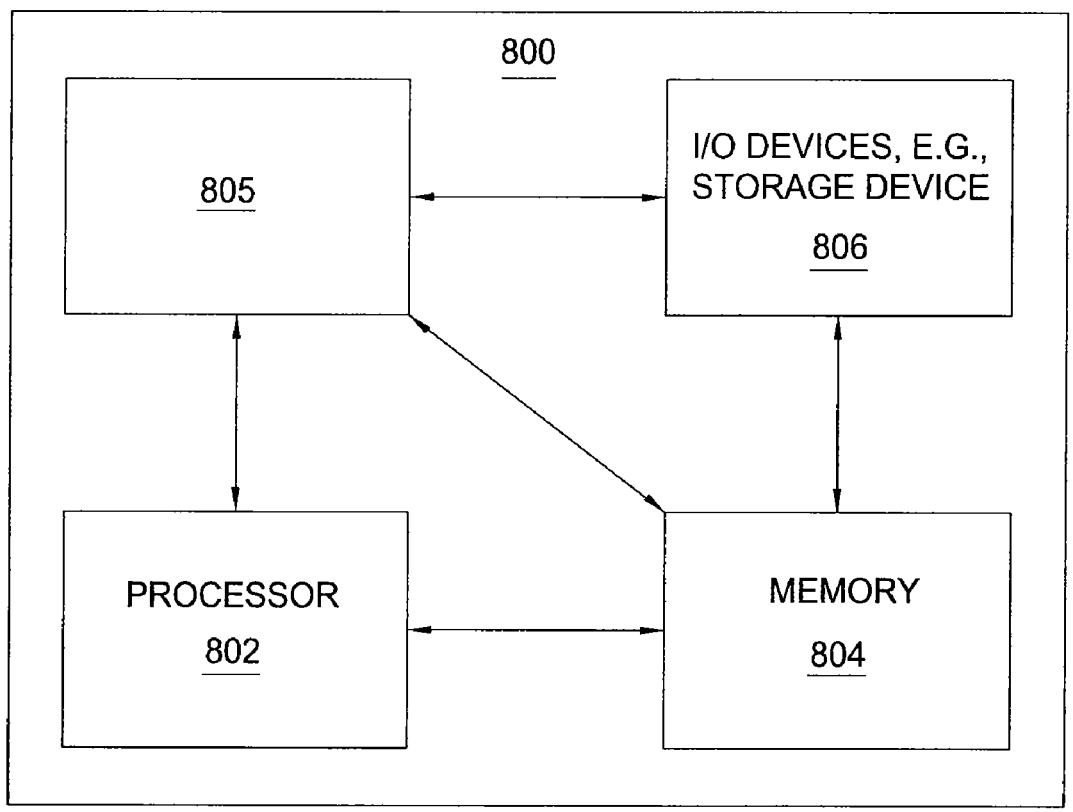
FIG. 8 illustrates a high-level block diagram of a general-purpose computer suitable for use in performing the functions described herein.

FIG. 8 depicts a high-level block diagram of a general-purpose computer suitable for use in performing the functions described herein. As depicted in FIG. 8, the system 800 comprises a processor element 802 (e.g., a CPU), a memory 804, e.g., random access memory (RAM) and/or read only memory (ROM), a module 805 for measuring and extracting proximity in networks, and various input/output devices 806 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 805 for measuring and extracting proximity in networks can be loaded into memory 804 and executed by processor 802 to implement the functions as discussed above. As such, the present method 805 for measuring and extracting proximity in networks (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for measuring proximity of at least two nodes in a network, comprising:
 computing by a processor a candidate sub-graph of the network;
 determining at least one cycle free escape conductivity (CFEC) proximity of the at least two nodes in accordance with the candidate sub-graph, wherein the CFEC proximity is determined in accordance with a cycle free escape probability, wherein the cycle free escape probability is a probability that a random walk originating at one of the at least two nodes reaches another one of the at least two nodes without visiting any node in the network more than once; and
 extracting a proximity sub-graph in accordance with the at least one cycle free escape conductivity (CFEC) proximity.

2. The method of claim 1, wherein the proximity sub-graph is presented as a visual output.

3. The method of claim 1, wherein the at least one cycle free escape conductivity (CFEC) proximity is determined in accordance with:

$$CFEC(s,t)=\deg_s \cdot P_{cf\_esc}(s \to t)$$

where s is a source node, t is a destination node, $\deg_s$ is a degree of the source node, and $P_{cf\_esc}(s \to t)$ is the cycle free escape probability from the source node s to the destination node t.

4. The method of claim 1, wherein the at least one cycle free escape conductivity (CFEC) proximity is determined in accordance with:

$$CFEC(t,s)=\deg_t \cdot P_{cf\_esc}(t \to s)$$

where s is a source node, t is a destination node, $\deg_t$ is a degree of the destination node, and $P_{cf\_esc}(t \to s)$ is the cycle free escape probability from the destination node t to the source node s.

5. The method of claim 3, wherein the cycle free escape probability is computed in accordance with a number of probable paths, where the number of probable paths is limited by a threshold.

6. The method of claim 1, wherein the proximity sub-graph is determined based upon a predefined number of nodes.

7. The method of claim 1, wherein the proximity sub-graph is determined based upon a predefined minimum proximity value.

8. The method of claim 1, wherein the proximity sub-graph is determined based upon a ratio, where the ratio reflects a size versus proximity tradeoff.

9. A non-transitory computer readable-medium having stored thereon a plurality of instructions, the plurality of instructions including instructions which, when executed by a processor, cause the processor to perform steps of a method for measuring proximity of at least two nodes in a network, comprising:
 computing a candidate sub-graph of the network;
 determining at least one cycle free escape conductivity (CFEC) proximity of the at least two nodes in accordance with the candidate sub-graph, wherein the CFEC proximity is determined in accordance with a cycle free escape probability, wherein the cycle free escape probability is a probability that a random walk originating at one of the at least two nodes reaches another one of the at least two nodes without visiting any node in the network more than once; and
 extracting a proximity sub-graph in accordance with the at least one cycle free escape conductivity (CFEC) proximity.

10. A non-transitory computer-readable medium of claim 9, wherein the proximity sub-graph is presented as a visual output.

11. A non-transitory computer-readable medium of claim 9, wherein the at least one cycle free escape conductivity (CFEC) proximity is determined in accordance with:

$$CFEC(s,t)=\deg_s \cdot P_{cf\_esc}(s \to t)$$

where s is a source node, t is a destination node, $\deg_s$ is a degree of the source node, and $P_{cf\_esc}(s \to t)$ is the cycle free escape probability from the source node s to the destination node t.

12. A non-transitory computer-readable medium of claim 9, wherein the at least one cycle free escape conductivity (CFEC) proximity is determined in accordance with:

$$CFEC(t,s)=\deg_t \cdot P_{cf\_esc}(t \to s)$$

where s is a source node, t is a destination node, $\deg_t$ is a degree of the destination node, and $P_{cf\_esc}(t \to s)$ is the cycle free escape probability from the destination node t to the source node s.

13. A non-transitory computer-readable medium of claim 11, wherein the cycle free escape probability is computed in accordance with a number of probable paths, where the number of probable paths is limited by a threshold.

14. A non-transitory computer-readable medium of claim 9, wherein the proximity sub-graph is determined based upon a predefined number of nodes.

15. A non-transitory computer-readable medium of claim 9, wherein the proximity sub-graph is determined based upon a predefined minimum proximity value.

16. A non-transitory computer-readable medium of claim 9, wherein the proximity sub-graph is determined based upon a ratio, where the ratio reflects a size versus proximity tradeoff.

17. An apparatus for measuring proximity of at least two nodes in a network, comprising:
 means for computing a candidate sub-graph of the network;
 means for determining at least one cycle free escape conductivity (CFEC) proximity of the at least two nodes in accordance with the candidate sub-graph, wherein the CFEC proximity is determined in accordance with a cycle free escape probability, wherein the cycle free escape probability is a probability that a random walk originating at one of the at least two nodes reaches another one of the at least two nodes without visiting any node in the network more than once; and
 means for extracting a proximity sub-graph in accordance with the at least one cycle free escape conductivity (CFEC) proximity.

18. The apparatus of claim 17, wherein the proximity sub-graph is presented as a visual output.

19. The apparatus of claim 17, wherein the at least one cycle free escape conductivity (CFEC) proximity is determined in accordance with:

$$CFEC(s,t)=\deg_s \cdot P_{cf\_esc}(s \to t) \quad \text{or} \quad CFEC(t,s)=\deg_t \cdot P_{cf\_esc}(t \to s)$$

where s is a source node, t is a destination node, $\deg_s$ is a degree of the source node, $P_{esc}(s \rightarrow t)$ is the cycle free escape probability from the source node s to the destination node t, $\deg_t$ is a degree of the destination node, and $P_{esc}(t \rightarrow s)$ is the cycle free escape probability from the destination node t to the source node s.

20. The apparatus of claim 17, wherein the proximity subgraph is determined based upon a predefined number of nodes, a predefined minimum proximity value, or a ratio, where the ratio reflects a size versus proximity tradeoff.

* * * * *